(12) United States Patent
Santini et al.

(10) Patent No.: US 11,938,709 B2
(45) Date of Patent: Mar. 26, 2024

(54) SPOUT POUCH AND METHOD OF MAKING SAME

(71) Applicant: Dow Global Technologies LLC, Midland, MI (US)

(72) Inventors: Luis Alberto Santini, Tarragona (ES); Radisa Boskovic, Horgen (CH); Peter Hermann Roland Sandkuehler, Horgen (CH); Ramon Pradas Cortina, Barcelona (ES); Marti Nogué I Arbusa, Barcelona (ES); Carlos Almor Morujo, Barcelona (ES)

(73) Assignee: Dow Global Technologies LLC, Midland, MI (US)

( * ) Notice: Subject to any disclaimer, the term of this patent is extended or adjusted under 35 U.S.C. 154(b) by 546 days.

(21) Appl. No.: 17/047,922

(22) PCT Filed: May 15, 2019

(86) PCT No.: PCT/US2019/032392
§ 371 (c)(1),
(2) Date: Oct. 15, 2020

(87) PCT Pub. No.: WO2019/222332
PCT Pub. Date: Nov. 21, 2019

(65) Prior Publication Data
US 2021/0162728 A1    Jun. 3, 2021

(30) Foreign Application Priority Data
May 18, 2018    (EP) .................................... 18382344

(51) Int. Cl.
*B32B 37/04*    (2006.01)
*B29C 65/00*    (2006.01)
(Continued)

(52) U.S. Cl.
CPC .............. *B32B 37/04* (2013.01); *B29C 65/02* (2013.01); *B29C 66/723* (2013.01); *B32B 27/08* (2013.01);
(Continued)

(58) Field of Classification Search
CPC ......... B32B 37/04; B32B 27/08; B32B 27/32; B32B 37/185; B32B 2250/05;
(Continued)

(56) References Cited

U.S. PATENT DOCUMENTS 3,645,992 A    2/1972 Elston
3,914,342 A    10/1975 Mitchell
(Continued)

FOREIGN PATENT DOCUMENTS

CN    101920559 A    12/2010
CN    107709006 A    2/2018
(Continued)

OTHER PUBLICATIONS

Taiwan Search Report dated Jul. 13, 2022 pertaining to Taiwan Patent Application No. 108116542, 1 page.
(Continued)

*Primary Examiner* — Michael C Miggins
(74) *Attorney, Agent, or Firm* — Dinsmore & Shohl LLP

(57) ABSTRACT

The present disclosure includes a process for making a package having a spout. The process includes heating a sealing area of a spout to a temperature at or above a melting point of the spout material; heating two multilayer structures around a portion of their peripheries to adhere the peripheries of sealant layers and form a partially sealed package having an opening; inserting the heated spout into the opening; and pressing opposing surfaces of the two multilayer structures around the spout to close the opening around the spout. Each multilayer structure includes a multilayer
(Continued)

film having the sealant layer having at least 40% by weight of an ethylene-based polymer having a melting point below 112 C; an external layer including an ethylene-based polymer; and at least one intermediate layer disposed between the sealant layer and the external layer having a melting point at least 15 C higher than the sealant layer.

19 Claims, 3 Drawing Sheets

(51) Int. Cl.
  *B29C 65/02* (2006.01)
  *B32B 27/08* (2006.01)
  *B32B 27/30* (2006.01)
  *B32B 27/32* (2006.01)
  *B32B 27/34* (2006.01)
  *B32B 37/18* (2006.01)
  *B65D 47/06* (2006.01)

(52) U.S. Cl.
  CPC ............ *B32B 27/306* (2013.01); *B32B 27/32* (2013.01); *B32B 27/34* (2013.01); *B32B 37/185* (2013.01); *B65D 47/06* (2013.01); *B32B 2250/05* (2013.01); *B32B 2250/24* (2013.01); *B32B 2307/30* (2013.01); *B32B 2307/518* (2013.01); *B32B 2307/72* (2013.01); *B32B 2323/043* (2013.01); *B32B 2323/046* (2013.01); *B32B 2323/10* (2013.01); *B32B 2329/04* (2013.01); *B32B 2377/00* (2013.01)

(58) Field of Classification Search
  CPC ............ B32B 2250/24; B32B 2307/30; B32B 2307/518; B32B 2307/72; B32B 2323/043; B29C 65/02; B29C 66/723
  See application file for complete search history.

(56) References Cited

U.S. PATENT DOCUMENTS

| | | |
|---|---|---|
| 4,063,990 A | 12/1977 | Volz et al. |
| 4,076,698 A | 2/1978 | Anderson et al. |
| 4,339,507 A | 7/1982 | Kurtz et al. |
| 4,512,136 A | 4/1985 | Christine |
| 4,599,392 A | 7/1986 | McKinney et al. |
| 5,272,236 A | 12/1993 | Lai et al. |
| 5,278,272 A | 1/1994 | Lai et al. |
| 5,473,857 A | 12/1995 | Keeler |
| 5,582,923 A | 12/1996 | Kale et al. |
| 5,733,155 A | 3/1998 | Sagawa |
| 5,854,045 A | 12/1998 | Fang et al. |
| 6,592,918 B2 | 7/2003 | Kaeser |
| 6,655,114 B2 | 12/2003 | Tiramoto et al. |
| 7,335,148 B2 | 2/2008 | Tsutsui et al. |
| 7,677,712 B2 | 3/2010 | Ishizawa et al. |
| 7,850,044 B2 | 12/2010 | Hildebrand et al. |
| 8,181,823 B2 | 5/2012 | Fukuizumi et al. |
| 8,371,469 B2 | 2/2013 | Takedutsumi et al. |
| 10,808,092 B2 | 10/2020 | Sasaki et al. |
| 2006/0013974 A1 | 1/2006 | Mizuo et al. |
| 2006/0199716 A1 | 9/2006 | Tsutsui et al. |
| 2015/0005148 A1 | 1/2015 | Ohmae et al. |
| 2016/0068316 A1 | 3/2016 | Wolff et al. |
| 2017/0081064 A1 | 3/2017 | van der Meijden et al. |
| 2017/0088328 A1* | 3/2017 | Franca ................... B65D 31/10 |
| 2018/0086515 A1* | 3/2018 | Ma .......................... B65D 33/08 |
| 2019/0232613 A1 | 8/2019 | Bensason et al. |

FOREIGN PATENT DOCUMENTS

| | | |
|---|---|---|
| EP | 2055470 B1 | 8/2015 |
| JP | 19950716956 A | 1/1995 |
| JP | 2001240083 A | 9/2001 |
| JP | 4150610 B2 | 9/2004 |
| JP | 4607653 B2 | 11/2006 |
| JP | 4607654 B2 | 11/2006 |
| JP | 2007016956 A | 1/2007 |
| JP | 4871100 B2 | 6/2008 |
| JP | 4871101 B2 | 6/2008 |
| JP | 2009132001 A | 6/2009 |
| JP | 2004148578 A | 3/2010 |
| JP | 5399108 B2 | 10/2010 |
| JP | 2014065278 A | 4/2014 |
| KR | 1409285 B1 | 6/2014 |
| KR | 1485151 B1 | 1/2015 |
| TW | 201502013 A | 1/2015 |
| TW | 201603932 A | 2/2016 |
| WO | 9521743 A1 | 8/1995 |
| WO | 2016149259 A1 | 9/2016 |
| WO | 2017003773 A1 | 1/2017 |
| WO | 2017003775 A1 | 1/2017 |
| WO | 2017205168 A1 | 11/2017 |
| WO | 2018064027 A1 | 4/2018 |

OTHER PUBLICATIONS

Chinese Search Report, dated Jun. 29, 2022, pertaining to Chinese Patent Application No. 201980028840.X 2 pages.
Chinese Office Action, dated Jun. 29, 2022, pertaining to Chinese Patent Application No. 201980028840.X 5 pages.
Chinese Search Report dated Jan. 10, 2023, pertaining to Chinese Patent Application No. 202080027797.8 2 pages.
Chinese Office Action dated Jan. 10, 2023, pertaining to Chinese Patent Application No. 202080027797.8 3 pages.
International Search Report and Written Opinion pertaining to PCT/US2019/032392, dated Aug. 21, 2019.
Extended European Search Report pertaining to corresponding European Patent Application No. 18382344.2, dated Oct. 8, 2018.
Japanese Office Action dated Jan. 23, 2023, pertaining to Japanese Patent Application No. 2020-561018 8 pages.

* cited by examiner

SPOUT POUCH AND METHOD OF MAKING SAME

CROSS-REFERENCE TO RELATED APPLICATIONS

This application is a National Stage Entry under 35 U.S.C. 071 of International Patent Application No. PCT/US2019/032392, filed May 15, 2019, which claims the benefit of European Patent Application Serial No. 18382344.2, filed May 18, 2018, both of which are hereby incorporated by reference in their entireties.

TECHNICAL FIELD

Embodiments of the present disclosure generally relate to processes for making a package comprising a spout.

BACKGROUND

Flexible pouch packaging with sealed fitments, also known as spout-pouches, are increasing in popularity to package many types of food and nonfood products. The spout-pouches offer advantages with respect to sustainability improvement, logistics chain optimization, complete consumption of the packaged product, less space after disposal, and other benefits. However, manufacturing methods and processes for making spout-pouches have limited the feasible materials for utilization in spout-pouch creation. Specifically, traditional systems for spout-pouch creation have utilized heat sealing of the spout by applying heat and pressure by means of a constantly heated sealing tool from the outside of the film forming the pouch. As a result, heat must pass from the heated sealing tools, through the pouch film, and to the interface between the pouch film and the spout thereby necessitating high temperatures to create a seal with heat transfer through the whole film thickness. Thus, external layers for spout-pouches have been limited to materials with a melting point in excess of 200° C. as such materials must contact the heated sealing tool potentially at a temperature of 200° C. Additionally, the necessary heating throughout the entire thickness of the pouch film results in softening of the entire pouch film which may lead to thinning and introduction of pouch weakness when pressure is applied during spout fixation.

SUMMARY

Accordingly, ongoing needs exist for improved processes for making a package comprising a spout. Packages with spouts produced in accordance with some embodiments of processes of the present disclosure do not exhibit a significant reduction in film thickness of the sealing layer. Traditional packages with spouts have a thinning of the film thickness resulting from heating the entire film thickness and melting of the entire sealing layer in combination with an applied squeezing pressure during spout installation. One or more of these needs are met by various process embodiments of the present disclosure, and the specific films used in such processes.

According to one or more embodiments, a process for making a package having a spout may include (a) heating a sealing area of a spout to a temperature at or above a melting point of the spout material; (b) heating two multilayer structures around a portion of their peripheries to adhere the peripheries of sealant layers to each other and form a partially sealed package having an opening; (c) inserting at least a portion of the heated spout into the opening; and (d) pressing opposing surfaces of the two multilayer structures around the spout to close the opening around the spout. Each multilayer structure comprises a multilayer film, the multilayer film comprising: the sealant layer having at least 40% by weight of an ethylene-based polymer having a melting point below 112° C., a melt index ($I_2$) from 0.5 to 8 g/10 mins as determined by ASTM D1238 (190° C., 2.16 kg), and a density between 0.880 and 0.918 g/cm³; an external layer comprising ethylene-based polymer; at least one intermediate layer disposed between the sealant layer and the external layer and having a melting point at least 15° C. higher than the sealant layer, wherein the intermediate layer comprises: ethylene-based polymer having a density above 0.920 g/cm³, and a melt index ($I_2$) from 0.25 to 5 g/10 mins; propylene based polymer; or mixtures thereof.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
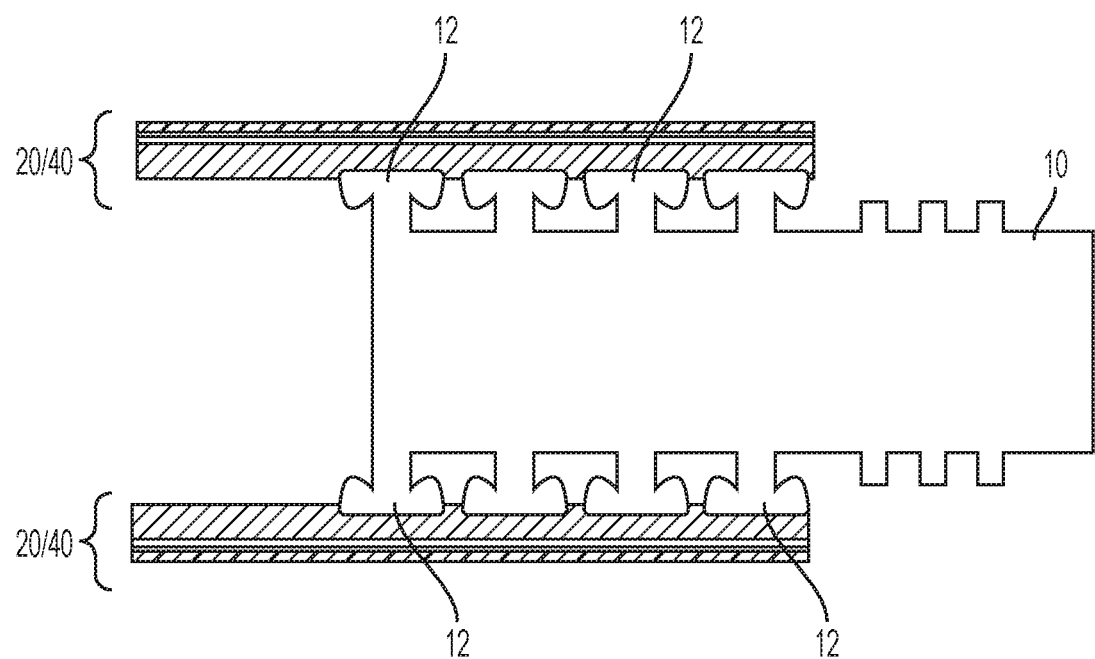
FIG. 1 schematically depicts a cross-sectional view of the spout sealing area of a multilayer film package having a spout, in accordance with one or more embodiments of the present disclosure.

Embodiments of the present disclosure are directed to processes for making a multilayer film package having a spout.

As used herein, melt index ($I_2$) is a measure of the extrusion flow rate of a polymer and is generally measured using ASTM D1238 at a temperature of 190° C. and 2.16 kg of load.

The term "polymer" refers to a polymeric compound prepared by polymerizing monomers, whether of the same or a different type. The generic term polymer thus embraces the term "homopolymer" usually employed to refer to polymers prepared from only one type of monomer as well as "copolymer" which refers to polymers prepared from two or more different monomers. The term "block copolymer" refers to a polymer comprising two or more chemically distinct regions or segments (referred to as "blocks"). In some embodiments, these blocks may be joined in a linear manner, that is, a polymer comprising chemically differentiated units which are joined end-to-end. A "random copolymer" as used herein comprises two or more polymers where each polymer may comprise a single unit or a plurality of successive repeat units along the copolymer chain back bone. Even though some of the units along the copolymer chain backbone exist as single units, these are referred to as polymers herein.

"Polyethylene" or "ethylene-based polymer" shall mean polymers comprising greater than 50 mole percent (mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). As used herein, "ethylene/α-olefin random copolymer" is a random copolymer comprising greater than 50% by weight of units derived from ethylene monomer The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm.

The term "LLDPE", includes resin made using Ziegler-Natta catalyst systems as well as resin made using single-site catalysts, including, but not limited to, bis-metallocene catalysts (sometimes referred to as "m-LLDPE") and constrained geometry catalysts, and resin made using post-metallocene, molecular catalysts. LLDPE includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The LLDPE resins can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, single-site catalysts including, but not limited to, bis-metallocene catalysts and constrained geometry catalysts, and post-metallocene, molecular catalysts.

The term "polypropylene" or "propylene-based polymer," as used herein, refers to a polymer that comprises, in polymerized form, refers to polymers comprising greater than 50 mol % of units which have been derived from propylene monomer. This includes propylene homopolymer, random copolymer polypropylene, impact copolymer polypropylene, propylene/a-olefin interpolymer, and propylene/alpha-olefin copolymer. These polypropylene materials are generally known in the art.

The term "multilayer structure" or "multilayer film" means any structure or film having more than one layer. For example, the multilayer structure (for example, a film) may have two, three, four, five or more layers.

As used herein, a "seal" refers to a closure of two or more items in contact, direct or indirect, that is tight enough to prevent passage of unwanted materials through the point or surface of contact. A seal may be mechanical or chemical in nature. For example, a mechanical seal might consist of two rigid surfaces that are interlocked in such a fashion as to prevent movement of the surfaces and movement between the surfaces, such as zippers, snap lids, or similar devices. Examples of chemical seals include solders, welds, adhesives, or similar substances that use a temperature, pressure, or a combination thereof to introduce a chemical composition that prevents movement of two or more items. The seal encompasses the items in contact, the surface or point of contact, and any other materials that might be at the surface or point of contact. The tightness of a seal may vary; hermetic seals, particle-tight seals, dust-tight seals, water-tight seals, liquid-tight seals, air-tight seals, wet gas-tight seals, or dry gas-tight seals are contemplated.

The term "package" as used herein, includes sealed containers formed from multilayer films. Examples packaging types may include, but are not limited to pouch packaging such as pillow pouches, stand-up pouches, or other pouches.

The processes for making a package comprising a spout disclosed herein may include (a) heating a sealing area of a spout to a temperature at or above a melting point of the spout material, (b) heating two multilayer structures around a portion of their peripheries to adhere the peripheries of sealant layers to each other and form a partially sealed package having an opening, (c) inserting at least a portion of the heated spout into the opening, and (d) pressing opposing surfaces of the two multilayer structures around the spout to close the opening around the spout. The two multilayer structures may each comprise a multilayer film. The multilayer film of the two multilayer structures forming the partially sealed package have an opening formed from the sealant layer, an external layer and at least one intermediate layer disposed between the sealant layer and the external layer.

Making a pouch comprising a spout in accordance with processes of this disclosure may include two heating steps, a high temperature step and a low temperature step. In the high temperature step, the sealing area of a spout may be heated to the temperature at or above the melting point of the spout material. This heating produces localized heating and melting of the spout. The heating of the sealing area of the spout may be completed using a heating element heated to a high temperature substantially in excess of the melting point of the spout material. The high temperature allows the heating element to be in contact with the spout for a shorter period of time to minimize time for heat transfer through the spout. As a result, the surface of the spout may be melted without affecting the rest of the spout including material at the core of the spout. A temperature substantially in excess of the melting point of the spout material also increases pyrolysis in the presence of oxygen of residual spout material which may remain adhered to the heating element, thereby reducing or avoiding fouling.

The greater the heating element temperature, the less time in contact is necessary to produce localized melting of the spout. In various embodiments, the heating element may be heated to a surface temperature in excess of 450° C., in excess of 350° C., or in excess of 250° C., including ranges of 250° C. to 450° C., 350° C. to 450° C., and 400° C. to 450° C. As partially determined by the material of the spout, the geometry of the spout, and the heating element temperature, the period of heating with the spout in contact with the heating element may be varied to achieve a desired degree of melting. In various embodiments, the spout may be maintained in contact with the heating element for 0.05 seconds (s) to 1.0 s, 0.1 s to 0.8 s, or 0.2 to 0.5 s.

Subsequent to heating the sealing area of the spout, the spout is inserted at least partially into the opening of the partially sealed package formed by two multilayer structures around a portion of their peripheries in the low temperature step with the application of supplemental heating. Pressure is applied by pressing opposing surfaces of the two multilayer structures around the spout to close the opening around the spout. The localized melting of the spout results in heat transfer from the molten spout to the sealant layers of the multilayer structures resulting in activation of the sealant layers. Supplemental heating may be applied comprising heating the opposing surfaces of the two multilayer structures to facilitate closing of the opening around the spout. The supplemental heating may be applied in combination with the pressure to seal the opening. The supplemental heating warms the two multilayer structures in the region of the opening to aid and facilitate sealing of the sealant layers and thereby the multilayer structures. In various embodiments, the supplemental heating may be applied at a temperature less than 120° C., less than 110° C., or less than 100° C., including ranges of 40° C. to 120° C., 60° C. to 110° C., 80° C. to 100° C. The supplemental heating may be applied at a temperature below the melting point of the multilayer structures, especially the external layer and at least one intermediate layer, to ensure any melting of the multilayer structures results from heat transfer from the spout. Minimizing melting of the multilayer structures assists in maintaining the thickness and integrity of the multilayer structure after securement of the spout.

With reference to FIG. 1, the fusing and sealing arrangement resulting from one or more embodiments of the processes of the present disclosure is illustrated. Ribs 12 on the spout 10 are softened and melted from the heating of the sealing area of the spout 10 interface with the multilayer films 20 thereby forming a seal between the spout 10 and the multilayer films 20. The spout 10 deforms and minimally melts and depresses into the multilayer films 20. It is noted that the thickness of the multilayer films 20 are substantially maintained. For purposes of this disclosure "substantially maintained" means that the multilayer film 20 retains at least 70%, at least 80%, at least 90%, or at least 95% of an original film thickness before spout sealing.

The spout 10 may be formed of any of a variety of polymers to allow for melting and softening upon heating of the sealing area of the spout 10. In one or more embodiments, the spout 10 comprises high density polyethylene (HDPE). In other embodiments, the spout 10 comprises polypropylene (PP). The spout 10 can also be formed from polymer compositions comprising blends of polymers. It will be appreciated that the melting point for materials, including commercially available HDPE and PP, are well-known and available to one skilled in the art. Additional information regarding spouts and materials that can be used to form spouts for use in various embodiments of the present invention can be found in PCT Publication Nos. WO2017/205168 and WO2018/064027, which are hereby incorporated by reference.

The package formed from the two multilayer structures 40 and the spout 10 may be a pouch. In further embodiments, the package may specifically be a stand-up style pouch. It will further be appreciated that the package may comprise one or more spouts 10 positioned at any location along the periphery of the multilayer structures 40. It will further be appreciated that the spouts 10 may comprise varying geometries and have ancillary features such as caps and valves as determined by the specific needs and desires for each individual package.

Figure 2:
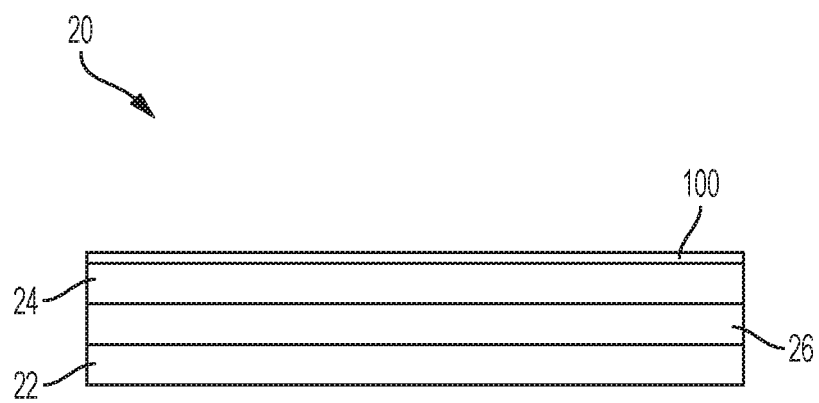
FIG. 2 schematically depicts a cross-sectional view of a multilayer film that includes 3 layers and a surface coating, in accordance with one or more embodiments of the present disclosure.
Figure 3:
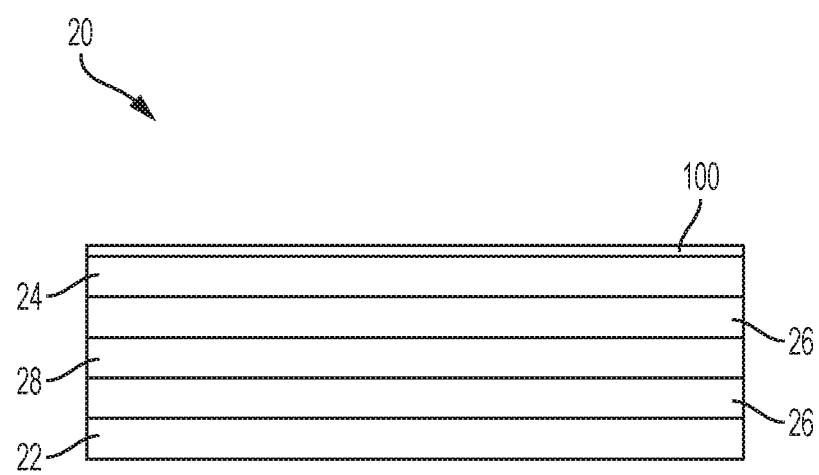
FIG. 3 schematically depicts a cross-sectional view of a multilayer film that includes 5 layers and a surface coating, in accordance with one or more embodiments of the present disclosure.

Directing attention to the multilayer film 20 of the two multilayer structures 40 and with reference to FIGS. 2 and 3, the multilayer film 20 may include a sealant layer 22, an external layer 24 and at least one intermediate layer 26 disposed between the sealant layer 22 and the external layer 24. As indicated, the multilayer film 20 may be formed as a three layer structure having a middle layer B, and two external layers A and C arranged as A/B/C. Similarly, the multilayer film 20 may be formed as a structure having two middle layers B and C and two external layers A and D arranged as A/B/C/D. It will be appreciated that the multilayer structure 40 of embodiments of the multilayer film 20 provides innumerable possibilities such as A/B/A, A/B/C/A, and A/B/C/B/D as well as additional combinations with more layers such as A/B/C/D/E/F/G or A/B/C/D/C/E/B with the present disclosure contemplating each possibility.

Each of the sealant layer 22, the one or more intermediate layers 26, and the external layer 24 may comprise an ethylene-based polymer, a propylene-based polymer, or a mixture thereof in some embodiments.

The sealant layer 22 of the multilayer film 20 may comprise at least 40 weight percent (wt. %) of a first ethylene-based polymer having a melting point below 112° C., a melt index ($I_2$) from 0.5 to 8 g/10 mins as determined by ASTM D1238 (190° C., 2.16 kg), and a density between 0.880 and 0.918 g/cm$^3$.

In various embodiments, the sealant layer 22 may comprise at least 40 wt. % of the first ethylene-based polymer, at least 50 wt. % of the first ethylene-based polymer, at least 60 wt. % of the first ethylene-based polymer, at least 70 wt. % of the first ethylene-based polymer, or at least 80 wt. % of the first ethylene-based polymer. All individual values and subranges from 40 to 100 wt. % are included herein and disclosed herein; for example the amount of the first ethylene-based polymer with the delineated characteristics may be from a lower limit of 40, 50, 60, 70, or 80 wt. % to an upper limit of 80, 90, or 100 wt. %. For example, the amount of the first ethylene-based polymer forming the sealant layer 22 may be from 40 to 100 wt. %, or in the alternative, from 60 to 90 wt. %, or in the alternative, from 80 to 100 wt. %, or in the alternative from 82 to 87 wt. c.

As indicated, the first ethylene-based polymer may have a density from 0.880 to 0.918 g/cm$^3$. All individual values and subranges from 0.880 to 0.918 g/cm$^3$ are included herein and disclosed herein; for example, the density of the first ethylene-based polymer can be from an upper limit of 0.918, 0.912, or 0.908 g/cm$^3$ and a lower limit of 0.880, 0.890, or 0.900 g/cm$^3$.

As indicated, the first ethylene-based polymer may have a melt index ($I_2$) measured according to ASTM D 1238 of 0.5 to 8.0 g/10 min. All individual values and subranges from 0.5 to 8.0 g/10 min are included herein and disclosed herein; for example, the melt index of the first ethylene-based polymer can be from an upper limit of 8.0, 7.0, 5.5, 4.0, or 3.0 g/10 minutes and a lower limit of 0.5, 0.7, 0.9, or 1.1 g/10 min.

The first ethylene-based polymer may have a melting point of 112° C. or less in some embodiments. The first ethylene-based polymer may have a melting point of in the range of 90° C. to 105° C., 90° C. to 100° C., or 95° C. to 100° C. in various further embodiments.

In one or more embodiments, the first ethylene-based polymer may be a plastomer, such as a polyolefin plastomer (POP), having a density from 0.890 to 0.908 g/cm$^3$ and a melt index ($I_2$) from 0.5 to 3 g/10 mins. All individual values and subranges from 0.890 to 0.908 g/cm$^3$ and 0.5 to 3 g/10 mins and their combinations are included herein and disclosed herein. For example, the density of the plastomer may be from an upper limit of 0.908, 0.906, or 0.904 g/cm$^3$ and a lower limit of 0.890, 0.895, or 0.900 g/cm$^3$. Similarly, the melt index of the plastomer may be from an upper limit of 3.0, 2.5, 2.0, or 1.5 g/10 minutes and a lower limit of 0.5, 0.7, 0.9, or 1.0 g/10 min.

Examples of the first ethylene-based polymer may include those commercially available from The Dow Chemical Company, Midland, MI including, for example, AFFINITY™ PF1140G, AFFINITY™ PL 1850G, AFFINITY™ PL 1880, AFFINITY™ PL 1881, or AFFINITY™ PF1166G.

The sealant layer 22 of the multilayer film 20 may also comprise a low density polyethylene (LDPE) polymer having a melt index ($I_2$) from 0.5 to 7.5 g/10 mins, and a density between 0.910 and 0.930 g/cm$^3$.

As indicated, the LDPE may have a melt index ($I_2$) of 0.5 to 7.5 g/10 min. All individual values and subranges from 0.5 to 7.5 g/10 min are included herein and disclosed herein; for example, the melt index of the first low density polyethylene polymer may be from an upper limit of 7.5, 3.0, 2.8, 2.5, 2.2, or 2.0 g/10 minutes and a lower limit of 0.5, 0.7, 0.9, or 1.1 g/10 min.

As indicated, the LDPE may have a density from 0.910 to 0.930 g/cm$^3$. All individual values and subranges from 0.910 to 0.930 g/cm$^3$ are included herein and disclosed herein; for example, the density of the first low density polyethylene polymer can be from an upper limit of 0.930, 0.925, or 0.920 g/cm$^3$ and a lower limit of 0.910, 0.915, or 0.920 g/cm$^3$.

Examples of the LDPE may include those commercially available from The Dow Chemical Company, Midland, MI including, for example, DOW™ LDPE 432E, LDPE 312E, LDPE 310E, or LDPE PG 7008.

The sealant layer 22 may also additionally comprise one or more additives. Additives can include, but are not limited to, antistatic agents, color enhancers, dyes, lubricants, fillers (for example, $TiO_2$ or $CaCO_3$), opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, oxygen scavengers, moisture scavengers, and combinations thereof, depending on the requirements of a particular application. In one or more embodiments the additive may comprise antiblock agent, slip agent, or combinations thereof.

Referring again to FIGS. 2 and 3, the external layer 24 of the multilayer film 20 may comprise a second ethylene-based polymer. In one or more embodiments, the external layer 24 may comprise at least 40 wt. % of the second ethylene-based polymer having a melting point of at least 15° C. greater than the sealant layer 22, a melt index ($I_2$) from 0.5 to 5.0 g/10 mins as determined by ASTM D1238 (190° C., 2.16 kg), and a density between 0.940 and 0.970 g/cm$^3$.

In various embodiments, the external layer 24 may comprise at least 40 wt. % of the second ethylene-based polymer, at least 50 wt. % of the second ethylene-based polymer, at least 65 wt. % of the second ethylene-based polymer, at least 75 wt. % of the second ethylene-based polymer, or at least 85 wt. % of the second ethylene-based polymer. All individual values and subranges from 40 to 100 wt. % are included herein and disclosed herein; for example the amount of the second ethylene-based polymer with the delineated characteristics may be from a lower limit of 40, 50, 60, 70, or 85 wt. % to an upper limit of 85, 95, or 100 wt. %, For example, the amount of the second ethylene-based polymer forming the external layer 24 may be from 40 to 100 wt. %, or in the alternative, from 65 to 95 wt. %, or in the alternative, from 85 to 100 wt. %, or in the alternative from 87 to 92 wt. %.

As indicated, the second ethylene-based polymer may have a density from 0.940 to 0.970 g/cm$^3$. All individual values and subranges from 0.940 to 0.970 g/cm$^3$ are included herein and disclosed herein; for example, the density of the second ethylene-based polymer can be from an upper limit of 0.970, 0.960, or 0.950 g/cm$^3$ and a lower limit of 0.940, 0.945, or 0.950 g/cm$^3$.

As indicated, the second ethylene-based polymer may have a melt index ($I_2$) measured according to ASTM D 1238 of 0.5 to 5.0 g/10 min. All individual values and subranges from 0.5 to 5.0 g/10 min are included herein and disclosed herein; for example, the melt index of the second ethylene-based polymer can be from an upper limit of 5.0, 3.0, 2.0, or 1.0 g/10 minutes and a lower limit of 0.5, 0.6, 0.7, or 0.8 g/10 min.

The second ethylene-based polymer may have a melting point of at least 15° C. greater than the sealant layer 22. The second ethylene-based polymer may have a melting point of at least 25° C. greater than the sealant layer 22, at least 35° C. greater than the sealant layer 22, of at least 45° C. greater than the sealant layer 22 in various further embodiments.

Examples of the second ethylene-based polymer may include those commercially available from The Dow Chemical Company, Midland, MI including, for example, ELITE™ 5960G or ELITE™ 5940G as well as various HDPE resins commercially available.

The intermediate layer 26 of the multilayer film 20 may comprise a third ethylene-based polymer. In one or more embodiments, the intermediate layer 26 may comprise at least 40 wt. % of the third ethylene-based polymer. The third ethylene-based polymer may have a melting point of at least 15° C. greater than the sealant layer 22, a melt index ($I_2$) from 0.25 to 5.0 g/10 mins as determined by ASTM D1238 (190° C., 2.16 kg), and a density greater than 0.920 g/cm$^3$.

In various embodiments, the intermediate layer 26 may comprise at least 40 wt. % of the third ethylene-based polymer, at least 50 wt. % of the third ethylene-based polymer, at least 65 wt. % of the third ethylene-based polymer, at least 75 wt. % of the third ethylene-based polymer, or at least 85 wt. % of the third ethylene-based polymer. All individual values and subranges from 40 to 100 wt. % of the third ethylene-based polymer are included herein and disclosed herein; for example the amount of the third ethylene-based polymer with the delineated characteristics may be from a lower limit of 40, 50, 60, 70, or 85 wt. % to an upper limit of 85, 95, or 1.00 wt. %. For example, the amount of the third ethylene-based polymer forming the intermediate layer 26 may be from 40 to 100 wt. %, or in the alternative, from 65 to 95 wt. %, or in the alternative, from 85 to 100 wt. %, or in the alternative from 87 to 92 wt. %.

As indicated, the third ethylene-based polymer may have a density of at least 0.920 g/cm$^3$. All individual values and subranges from 0.920 to 0.970 g/cm$^3$ are included herein and disclosed herein; for example, the density of the second ethylene-based polymer can be from an upper limit of 0.970, 0.960, or 0.950 g/cm$^3$ and a lower limit of 0.920, 0.925, 0.935, or 0.950 g/cm$^3$. In one or more specific embodiments, the third ethylene-based polymer may have a density of 0.940 to 0.970 g/cm$^3$.

As indicated, the third ethylene-based polymer may have a melt index ($I_2$) measured according to ASTM D 1238 of 0.25 to 5.0 g/10 min. All individual values and subranges from 0.25 to 5.0 g/10 min are included herein and disclosed herein; for example, the melt index of the third ethylene-based polymer can be from an upper limit of 5.0, 4.5, 4.0, 3.5, or 3.0 g/10 minutes and a lower limit of 0.25, 0.4, 0.7, or 1.1 g/10 min.

The third ethylene-based polymer may have a melting point of at least 15° C. greater than the sealant layer 22. The third ethylene-based polymer may have a melting point of at least 25° C. greater than the sealant layer 22, at least 35° C. greater than the sealant layer 22, of at least 45° C. greater than the sealant layer 22 in various further embodiments.

Examples of the third ethylene-based polymer may include those commercially available from The Dow Chemical Company, Midland, MI including, for example, ELITE™ 5960G and ELITE™ 5940G.

It will be appreciated that one or more of the second ethylene-based polymer and the third ethylene-based polymer disposed in the external layer 24, and the at least one intermediate layer 26 respectively may comprise the same underlying ethylene-based polymer. For example, the external layer 24 and the at least one intermediate layer 26 may each comprise one or more of the same polymers.

The intermediate layer 26 of the multilayer film 20 may also comprise a linear low density polyethylene (LLDPE) polymer having a density of at least 0.935 g/cm$^3$. Examples of the LLDPE may include those commercially available from The Dow Chemical Company, Midland, MI including DOWLEX™ 2740G.

With reference to FIG. 3, in further embodiments, the multilayer film 20 may comprise five or more distinct layers. Specifically, the multilayer film may comprise the sealant layer 22, the external layer 24, at least two intermediate layers 26 adjacent the sealant layer 22 and the external layer 24, and one or more core layers 28 disposed between the at least two intermediate layers 26. While FIG. 3 illustrates a single core layer 28 disposed between the at least two intermediate layers 26, it will be appreciated that it is equally envisioned that the multilayer film 20 may comprise the intermediate layer 26 disposed between two or more of the core layers 28 such that reference numerals 26 and 28 are reversed in FIG. 3.

The core layer 28 may comprise an ethylene-based polymer having a melt index ($I_2$) from 0.25 to 5.0 g/10 mins, and a density between 0.900 and 0.925 g/cm$^3$. All individual density values and subranges from 0.900 to 0.925 g/cm$^3$ are included herein and disclosed herein; for example, the density of the ethylene-based polymer can be from an upper limit of 0.925, 0.922, or 0.920 g/cm$^3$ and a lower limit of 0.900, 0.905, 0.910 g/cm$^3$. All individual melt index values and subranges from 0.25 to 5.0 g/10 min are included herein and disclosed herein; for example, the melt index of the third ethylene-based polymer can be from an upper limit of 5.0, 3.0, 2.0, or 1.0 g/10 minutes and a lower limit of 0.25, 0.4, 0.6, or 0.7 g/10 min. Examples of the core layer 28 having the disclosed properties include those commercially available from The Dow Chemical Company, Midland, MI including, for example, INNATE™ ST50.

In some embodiments of multilayer structures where barrier properties are important, the core layer 28 may also or alternatively comprise ethylene vinyl alcohol, a polyamide, or combinations thereof. Examples of the ethylene vinyl alcohol forming the core layer 28 may include those commercially available from Kuraray America, Houston, TX including, for example, EVAL H171B, as well as others known to those of skill in the art. The polyamide may be any known to those skilled in the art as being useful for providing barrier properties. The ethylene vinyl alcohol or polyamide provides oxygen and/or water vapor barrier properties.

In embodiments where the core layer 28 comprises ethylene vinyl alcohol or polyamide, the intermediate layers 26 may be tie layers to facilitate adhesion between the core layer 28 and the sealant layer 22 or external layer 24, particularly when those layers are formed primarily from polyethylene and/or polypropylene. In some such embodiments, the intermediate layer 26 may comprise a maleic anhydride grafted polyethylene or other functionalized resins that are known to be useful as tie layers. A suitable commercial example of the maleic anhydride grafted polyethylene is AMPLIFY™ TY 1352 from The Dow Chemical Company (Midland, MI), and others known to those of skill in the art can also be used.

One or more of the layers of the multilayer film 20 may comprise a propylene-based polymer. Examples of the propylene-based polymer may include those commercially available from The Dow Chemical Company, Midland, MI including INTUNE™; LyondellBasell, Houston, TX including Moplen EP310D; and Borealis AG, Vienna, Austria including BorpactBC918CF.

As disclosed, the multilayer film 20 may comprise a variation in the number of layers forming the multilayer film 20 and the composition of each layer. In one or more embodiments, the multilayer film 20 as a whole comprises 90 wt. % or more of ethylene-based polymers based on the total weight of the multilayer film 20. That is the various compositions of each layer when combined together comprise at least 90 wt. % of ethylene-based polymers. In various further embodiments, the multilayer film 20 comprises at least 92 wt. %, at least 95 wt. %, at least 97 wt. %, at least 99 wt. %, at least 99.5 wt. %, at least 99.9 wt. %, or at least 99.95 wt. % of ethylene-based polymers. It will be appreciated that the multilayer film 20 may substantially comprise 100% ethylene-based polymers. For purposes of this disclosure "substantially comprise 100% ethylene-based polymers" means that the film is 100% ethylene-based polymers except for trace impurities or contaminants.

Figure 4:
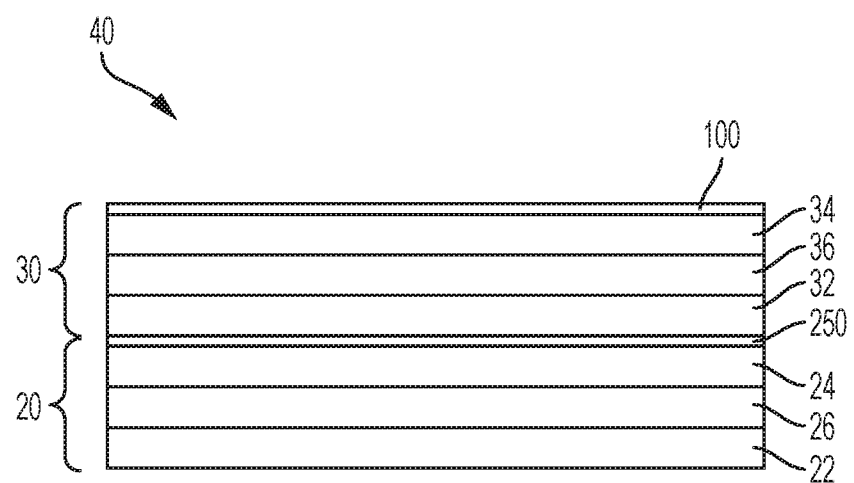
FIG. 4 schematically depicts a cross-sectional view of a laminated film, in accordance with one or more embodiments of the present disclosure.

With reference to FIG. 4, the multilayer structures 40 may comprise a laminated structure. In one or more embodiments, a first multilayer film may be laminated to a second multilayer film to form the laminated structure. For illustrative purposes, the multilayer structure 40 in FIG. 4 shows a second film 30 being laminated to the multilayer film 20 discussed above in connection with FIG. 2.

Laminated film can be prepared either by extrusion coating/lamination or adhesive lamination. Extrusion coating or lamination is a technique for producing packaging materials. Similar to cast film, extrusion coating is a flat die technique. A film can be extrusion coated onto a substrate either in the form of a monolayer or a coextruded extrudate according to, for example, the processes described in U.S. Pat. No. 4,339,507. Utilizing multiple extruders or by passing the various substrates through the extrusion coating system several times can result in multiple polymer layers each providing some sort of performance attribute whether it be barrier, toughness, or improved hot tack or heat sealability.

In one or more embodiments as depicted in FIG. 4, the second film 30 may comprise a multilayer structure 40. As such, the second film 30 may comprise a lamination layer 32, a surface layer 34, and one or more central layers 36. The lamination layer 32 may be adhered to the external layer 24 of the multilayer film 20 with an adhesive 250 forming a multilayer structure 40. The multilayer structure 40 may comprise an arrangement in accordance with: the centrally located sealant layer 22, one or more intermediate layers 26 with optional core layers 28 disposed between intermediate layers 26, the external layer 24, an adhesive layer, the lamination layer 32, the one or more central layers 36, and the surface layer 34.

Each of the lamination layer 32, the surface layer 34, and the one or more central layers 36 may comprise an ethylene-based polymer, a propylene-based polymer, or a mixture thereof in some embodiments.

In one or more embodiments, the second film 30 comprises one or more layers comprising a fourth ethylene-based polymer having a density from 0.940 to 0.970 g/cm$^3$ and a melt index ($I_2$) from 0.5 to 5.0 g/10 mins. It will be appreciated that each of the individual layers of the second film 30 may comprise different and distinct compositions.

As indicated, the fourth ethylene-based polymer may have a density from 0.940 to 0.970 g/cm$^3$. All individual values and subranges from 0.940 to 0.970 g/cm$^3$ are included herein and disclosed herein; for example, the density of the fourth ethylene-based polymer can be from an upper limit of 0.970, 0.960, or 0.950 g/cm$^3$ and a lower limit of 0.940, 0.945, or 0.950 g/cm$^3$.

As indicated, the fourth ethylene-based polymer may have a melt index ($I_2$) measured according to ASTM D 1238 of 0.5 to 5.0 g/10 min. All individual values and subranges from 0.5 to 5.0 g/10 min are included herein and disclosed herein; for example, the melt index of the fourth ethylene-based polymer can be from an upper limit of 5.0, 4.5, 4.0, 3.5, or 3.0 g/10 minutes and a lower limit of 0.5, 0.7, 0.9, or 1.1 g/10 min.

It will be appreciated that one or more of the first ethylene-based polymer, the second ethylene-based polymer, and the third ethylene-based polymer of the multilayer film 20 may comprise the same underlying ethylene-based polymer as the fourth ethylene-based polymer of the second film 30. For example, the second ethylene-based polymer forming the external layer 24 of the multilayer film 20 and the fourth ethylene-based polymer forming one or more layers of the second film 30 may each comprise one or more of the same polymers.

In alternative embodiments, the second film 30 comprises biaxially oriented polypropylene (BOPP), biaxially oriented polyamide (BOPA), or biaxially oriented polyethylene terephthalate BOPET). Examples of BOPP may include those commercially available from Taghleef Industries, Newark, DE including Taghleef TSS and Taghleef MUS; VIBAC Group, Ticineto, Italy including VIBC CT and VIBAC MTS; and Jindal Films, New Delhi, India including Bicor MB400 and Bicor CSRM. Examples of BOPA may include those commercially available from Domo Chemicals, Ghent-Zwijnaarde, Belgium including FILMON BX; and KOLON Industries, Seoul, Republic of Korea including AMIDROLL. Examples of BOPET may include those commercially available from DuPont Teijin Films, Chester, VA Mylar M813; and Mitsubishi Polyester Film, Greer, SC including Hostaphan RNK 2600 and Hostaphan RNK 2CSR.

One or more of the layers of the second film 30 may comprise a propylene-based polymer. Examples of the propylene-based polymer may include those commercially available from LyondellBasell, Houston, TX including Moplen EP310D; and Borealis AG, Vienna, Austria including Borpact BC918CF.

Similarly to that disclosed with regards to the multilayer film 20, the second film 30 may comprise a variation in the number of layers forming the second film 30 and the composition of each layer. In one or more embodiments, the second film 30 as a whole comprises 90 wt. % or more of ethylene-based polymers based on the total weight of the second film 30. That is the various compositions of each layer when combined together comprise at least 90 wt. % of ethylene-based polymers. In various further embodiments, the second film 30 comprises at least 92 wt. %, at least 95 wt. %, at least 97 wt. %, at least 99 wt. %, at least 99.5 wt. %, at least 99.9 wt. %, or at least 99.95 wt. % of ethylene-based polymers. It will be appreciated that the second film 30 may substantially comprise 100% ethylene-based polymers. In combination with a multilayer film 20 which substantially comprises 100% ethylene-based polymers, a multilayer structure 40 may be formed which in its entirety substantially comprises 100% ethylene-based polymers.

In one or more embodiments, the multilayer film 20 or the second film 30 may additionally comprise a surface coating 100. The surface coating 100 may be an ink, an overprinting lacquer, or both. The surface coating 100 provides for printing of package contents or other indicia on the multilayer structure 40.

The multilayer structure 40 may comprise a total thickness of 70 to 150 micrometers (μm) in some embodiments. The multilayer film 20 may comprise a total thickness of 70 to 120 μm when forming the entire multilayer structure 40 with no second film 30 provided forming a laminate structure. In various embodiments, the multilayer film 20 when provided alone comprises a total thickness of 70 to 110 μm, 80 to 120 μm, 90 to 110 μm, or approximately 110 μm. When the multilayer structure 40 comprises a laminate structure formed from both the multilayer film 20 and the second film 30, the multilayer film 20 may comprises a total thickness of 35 to 80 μm and the second film 30 may comprise a total thickness of 35 to 70 μm. In various embodiments, the multilayer film 20, when provided as part of a laminate structure, may comprise a total thickness of 35 to 75 μm, 50 to 80 μm, 60 to 80 μm, or approximately 70 μm. Similarly, in various embodiments, the second film 30, when provided as part of a laminate structure, may comprise a total thickness of 35 to 65 μm, 40 to 70 μm, 40 to 60 μm, or approximately 50 μm. It will be appreciated that the total thickness of the multilayer structure 40 may be adjusted by adding or removing individual layers of the multilayer film 20 and/or the second film 30 or changing the individual layer thicknesses. The individual layers within the multilayer film 20 and/or the second film 30 may also vary in thickness to provide the desired final package properties. While the multilayer film 20 and multilayer structure 40 are illustrated in FIGS. 2, 3, and 4, it will be appreciated that the relative thicknesses of the layers shown are intended for illustrative purposes only to distinguish the layers and should not be viewed as limiting the relative thicknesses of the layers.

It will be appreciated that processes for making a packaging comprising a spout in accordance with this disclosure offer benefits and advantages over traditional systems and methods. As an initial matter, thermal transfer does not need to pass through the entire thickness of the packaging. As a result, the outer layer of the package does not have to comprise very high thermal resistance. Specifically, traditional processes for making packages with a spout may require application of heat of 200° C. or greater directly to the outer surface of a multilayer film to ensure sufficient heat is transferred through the film to initiate sealing. The reduced thermal resistance requirements for the outer layers of the films allow ethylene-based polymers or propylene-based polymers to be used throughout the thickness of the package, including outer layers. The ability to utilize ethylene-based polymers or propylene-based polymers for the entirety of the package materials allow for a 100% recyclable package and the commensurate reduction in environmental impact. Specifically, ethylene-based polymers or propylene-based polymers forming both the multilayer structure 40 and the spout 10 improves the recyclability of the package over previously available specimens.

Packages with spouts produced in accordance with the processes of the present disclosure also do not exhibit a significant reduction in film thickness of the sealing layer or other film layers. Traditional packages with spouts have a thinning of the sealing layer resulting from heating the entire film thickness and melting of the entire sealing layer in combination with an applied squeezing pressure during spout installation. Avoiding film thickness reduction with the present processes by only melting and softening the extreme inner face of the sealant layer is expected to improve both burst and compression test resistance as a result of improved film integrity.

Processes for making packages comprising a spout in accordance with the present disclosure are expected to allow for increased production output in some embodiments. Specifically, materials with lower seal-initiation temperature (SIT) than are traditionally able to be used may form the sealant layer of the package which in turn facilitates higher machine speeds. The higher machine speeds are possible because with a lower SIT the sealant layer becomes molten in a shorter time due to contact with the molten spout necessitating less hold time while the opposing surfaces of the two multilayer structures around the spout are pressed to close the opening around the spout. Additionally, leaking packages may be reduced with the ability to use sealants with improved caulking effect when forming the pouch. Specifically, the direct heating of the sealant layer allows for premium sealants to be used with a lower SIT which would not be possible when forming the package by heating from the exterior of the package film.

EXAMPLES

The following Examples illustrate various embodiments of the multilayer structure 40, multilayer film 20, and second film 30 described herein.

Table 1 below includes properties of commercial polymers used in the Examples that follow.

TABLE 1

Properties of commercial polymers

| Material | Melt Index (I$_2$) g/10 min | Density (g/cm$^3$) | Supplier |
|---|---|---|---|
| ELITE ™ 5960 G (enhanced polyethylene) | 0.85 | 0.962 | The Dow Chemical Company, Midland, MI |
| ELITE ™ 5940 G (enhanced polyethylene) | 0.85 | 0.940 | The Dow Chemical Company, Midland, MI |
| AFFINITY ™ PF1140G (polyolefin plastomer) | 1.6 | 0.897 | The Dow Chemical Company, Midland, MI |
| AFFINITY ™ PF1146G (polyolefin plastomer) | 1.0 | 0.899 | The Dow Chemical Company, Midland, MI |
| AFFINITY ™ PL1880G (polyolefin plastomer) | 1.0 | 0.902 | The Dow Chemical Company, Midland, MI |
| AFFINITY ™ PL1881G (polyolefin plastomer) | 1.0 | 0.904 | The Dow Chemical Company, Midland, MI |
| DOW ™ LDPE 432E (LDPE) | 2.0 | 0.925 | The Dow Chemical Company, Midland, MI |
| DOW ™ LDPE 312E (LDPE) | 0.75 | 0.923 | The Dow Chemical Company, Midland, MI |
| DOW ™ LDPE 310E (LDPE) | 0.75 | 0.923 | The Dow Chemical Company, Midland, MI |
| INNATE ™ ST50 (polyethylene) | 0.85 | 0.912 | The Dow Chemical Company, Midland, MI |
| AMPLIFY ™ TY 1352 (maleic anhydride-grafted polyethylene) | 1.0 | 0.922 | The Dow Chemical Company, Midland, MI |
| EVAL H171B (EVOH) | 1.7 | 1.17 | Kuraray America, Inc, Houston, TX |

Three Layer Example

An example three layer structure for the multilayer film 20 is provided in Table 2. Specifically, a three layer structure for the multilayer film 20 may include a breakdown of 20 to 25 wt. % of the sealant layer 22, 50 to 60 wt. % of the intermediate layer 26, and 20 to 25 wt. % of the external layer 24. The sealant layer 22 may further be delineated into 80 to 100 wt. % of the first ethylene-based polymer such as AFFINITY™ PF1140G, AFFINITY™ PL1880G, AFFINITY™ PL1881G, or AFFINITY™ PF1146G. The remainder of the sealant layer 22 (0 to 20 wt. %) may comprise a LDPE such as DOW™ LDPE 432E, DOW™ LDPE 312E, or DOW™ LDPE 310E as well as slip and antiblocking agents. The intermediate layer 26 may further be delineated into 85 to 100 wt. % of the second ethylene-based polymer such as ELITE™ 5960G or ELITE™ 5940G. The remainder of the intermediate layer 26 (0 to 15 wt. %) may comprise a LDPE such as DOW™ LDPE 432E, DOW™ LDPE 312E, or DOW™ LDPE 310E. Finally, the external layer 24 may further be delineated into 85 to 100 wt. % of the third ethylene-based polymer such as ELITE™ 5960G or ELITE™ 5940G. The remainder of the external layer 24 (0 to 15 wt. %) may comprise a LDPE such as DOW™ LDPE 432E, DOW™ LDPE 312E, or DOW™ LDPE 310E.

TABLE 2

Example Three Layer Formulations

| Layer | Weight Percentage | Layer Breakdown and Example Composition | |
|---|---|---|---|
| External Layer | 20-25% | 85-100% | ELITE ™ 5960G or ELITE ™ 5940G |
| | | 0-15% | DOW ™ LDPE 432E, or DOW ™ LDPE 312E, or DOW ™ LDPE 310E |
| Intermediate Layer | 50-60% | 85-100% | ELITE ™ 5960G or ELITE ™ 5940G |
| | | 0-15% | DOW ™ LDPE 432E, or DOW ™ LDPE 312E, or DOW ™ LDPE 310E |
| Sealant Layer | 20-25% | 80-100% | AFFINITY ™ PF1140G, or AFFINITY ™ PL 1880, or AFFINITY ™ PL 1881, or AFFINITY ™ PF1146G |
| | | 0-20% | DOW ™ LDPE 432E, or DOW ™ LDPE 312E, or DOW ™ LDPE 310E + Slip and antiblocking agents |

Five Layer Example

An example five layer structure for the multilayer film 20 is provided in Table 3. Specifically, a five layer structure for the multilayer film 20 may include a breakdown of 20 to 25 wt. % of the sealant layer 22, 15 to 25 wt. % of the intermediate layer 26, 20 wt. % of the core layer 28, an additional 15 to 25 wt. % of the intermediate layer 26, and 15 to 25 wt. % of the external layer 24. The sealant layer 22 may further be delineated into 80 to 100 wt. % of the first ethylene-based polymer such as AFFINITY™ PF1140G, AFFINITY™ PL1880G, AFFINITY™ PL1881G, or AFFINITY™ PF1146G. The remainder of the sealant layer 22 (0 to 20 wt. %) may comprise a LDPE such as DOW™ LDPE 432E, DOW™ LDPE 312E, or DOW™ LDPE 310E as well as slip and antiblocking agents. Each of the intermediate layers 26 may further be delineated into 85 to 100 wt. % of the second ethylene-based polymer such as ELITE™ 5960G or ELITE™ 5940G. The remainder of each of the intermediate layers 26 (0 to 15 wt. %) may comprise a LDPE such as DOW™ LDPE 432E, DOW™ LDPE 312E, or DOW™ LDPE 310E. The core layer 28 may comprise 100 wt. % of INNATE™ ST-50. Finally, the external layer 24 may further be delineated into 85 to 100 wt. % of the third ethylene-based polymer such as ELITE™ 5960G or ELITE™ 5940G. The remainder of the external layer 24 (0 to 15 wt. %) may comprise a LDPE such as DOW™ LDPE 432E, DOW™ LDPE 312E, or DOW™ LD PE 310E.

TABLE 3

Example Five Layer Formulations

| Layer | Weight Percentage | Layer Breakdown and Example Composition | |
|---|---|---|---|
| External Layer | 20-25% | 85-100% | ELITE ™ 5960G or ELITE ™ 5940G |
| | | 0-15% | DOW ™ LDPE 432E, or DOW ™ LDPE 312E, or DOW ™ LDPE 310E |
| Intermediate Layer | 50-60% | 85-100% | ELITE ™ 5960G or ELITE ™ 5940G |
| | | 0-15% | DOW ™ LDPE 432E, or DOW ™ LDPE 312E, or DOW ™ LDPE 310E |
| Core Layer | 20% | 100% | INNATE ™ ST-50 |
| Intermediate Layer | 50-60% | 85-100% | ELITE ™ 5960G or ELITE ™ 5940G |
| | | 0-15% | DOW ™ LDPE 432E, or DOW ™ LDPE 312E, or DOW ™ LDPE 310E |
| Sealant Layer | 20-25% | 80-100% | AFFINITY ™ PF1140G, or AFFINITY ™ PL 1880, or AFFINITY ™ PL 1881, or AFFINITY ™ PF1146G |
| | | 0-20% | DOW ™ LDPE 432E, or DOW ™ LDPE 312E, or DOW ™ LDPE 310E + Slip and antiblocking agents |

Seven Layer Example

An example seven layer structure for the multilayer film 20 is provided in Table 4. Specifically, a seven layer structure for the multilayer film 20 may include a breakdown of 20 to 25 wt. % of the sealant layer 22, 20 to 25 wt. % of each of various intermediate layers 26, 5 to 20 wt. % each of the various core layers 28, and 20 to 25 wt. % of the external layer 24. The sealant layer 22 may further be delineated into 80 to 100 wt. % of the first ethylene-based polymer such as AFFINITY™ PF1140G, AFFINITY™ PL1880G, AFFINITY™ PL1881G, or AFFINITY™ PF1146G. The remainder of the sealant layer 22 (0 to 20 wt. %) may comprise a LDPE such as DOW™ LDPE 432E, DOW™ LDPE 312E, or DOW™ LDPE 310E as well as slip and antiblocking agents. The various intermediate layers 26 may be further divided into those with distinct characteristics and compositions. For example, the multilayer film 20 may comprise one or more intermediate layers 26 each comprising 5 to 8 wt. % of the multilayer film 20 formed from AMPLIFY™ TY 1352. One or more further intermediate layers 26 may form 20 to 25 wt. % of the multilayer film 20 and comprise 85 to 100 wt. % of the second ethylene-based polymer such as ELITE™ 5960G or ELITE™ 5940G with the remainder (0 to 15 wt/%) comprising a LDPE such as DOW™ LDPE 432E, DOW™ LDPE 312E, or DOW™ LDPE 310E. The various core layers 28 may be further divided into those with distinct characteristics and compositions. For example, the multilayer film 20 may comprise one or more core layers 28 each comprising 5 to 8 wt. % of the multilayer film 20 formed from EVAL™ H171B. One or more further core layers 28 may form 15 to 20 wt. % of the multilayer film 20 and comprise INNATE™ ST-50. Finally, the external layer 24 may further be delineated into 85 to 100 wt. % of the third ethylene-based polymer such as ELITE™ 5960G or ELITE™ 5940G. The remainder of the external layer 24 (0 to 15 wt. %) may comprise a LDPE such as DOW™ LDPE 432E, DOW™ LDPE 312E, or DOW™ LDPE 310E.

TABLE 4

Example Seven Layer Formulations

| Layer | Weight Percentage | | Layer Breakdown and Example Composition |
|---|---|---|---|
| External Layer | 20-25% | 85-100% | ELITE ™ 5960G or ELITE ™ 5940G |
|  |  | 0-15% | DOW ™ LDPE 432E, or DOW ™ LDPE 312E, or DOW ™ LDPE 310E |
| Core Layer | 15-20% | 100% | INNATE ™ ST-50 |
| Intermediate Layer | 5-8% | 100% | AMPLIFY ™ TY 1352 |
| Core Layer | 5-8% | 100% | EVAL H171B |
| Intermediate Layer | 5-8% | 100% | AMPLIFY ™ TY 1352 |
| Intermediate Layer | 50-60% | 85-100% | ELITE ™ 5960G or ELITE ™ 5940G |
|  |  | 0-15% | DOW ™ LDPE 432E, or DOW ™ LDPE 312E, or DOW ™ LDPE 310E |
| Sealant Layer | 20-25% | 80-100% | AFFINITY ™ PF1140G, or AFFINITY ™ PL 1880, or AFFINITY ™ PL 1881, or AFFINITY ™ PF1146G |
|  |  | 0-20% | DOW ™ LDPE 432E, or DOW ™ LDPE 312E, or DOW ™ LDPE 310E + Slip and antiblocking agents |

Laminate Example

A laminate may form the multilayer structure 40 formed from the multilayer film 20 and the second film 30. An example second film 30 is provided in Table 5. The second film 30 may be affixed to any of numerous multilayer films 20 including the three layer, five layer, and seven layer examples provided previously. The structure of the second film 30 may include a breakdown of 20 to 25 wt. % of the lamination layer 32, 50 to 60 wt. % of the central layer 36, and 20 to 25 wt. % of the surface layer 34. The lamination layer 32 may further be delineated into 85 to 100 wt. % of the fourth ethylene-based polymer such as ELITE™ 5960G, ELITE™ 5940G, or INNATE™ ST-50 with the remainder of the lamination layer 32 (0 to 20 wt. %) comprising a LDPE such as DOW™ LDPE 432E, DOW™ LDPE 312E, or DOW™ LDPE 310E. The central layer 36 may further be delineated into 85 to 100 wt. % of the fourth ethylene-based polymer such as ELITE™ 5960G or ELITE™ 5940G. The remainder of the central layer 36 (0 to 15 wt. %) may comprise a LDPE such as DOW™ LDPE 432E, DOW™ LDPE 312E, or DOW™ LDPE 310E. Finally, the surface layer 34 may further be delineated into 85 to 100 wt. % of the fourth ethylene-based polymer such as ELITE™ 5960G or ELITE™ 5940G. The remainder of the surface layer 34 (0 to 15 wt. %) may comprise a LDPE such as DOW™ LDPE 432E, DOW™ LDPE 312E, or DOW™ LDPE 310E.

TABLE 5

Example Three Layer Formulations

| Layer | Weight Percentage | | Layer Breakdown and Example Composition |
|---|---|---|---|
| Lamination Layer | 20-25% | 85-100% | ELITE ™ 5960G or ELITE ™ 5940G |
|  |  | 0-15% | DOW ™ LDPE 432E, or DOW ™ LDPE 312E, or DOW ™ LDPE 310E |
|  |  |  | OR |
|  |  | 85-100% | INNATE ™ ST-50 |
|  |  | 0-15% | DOW ™ LDPE 432E, or DOW ™ LDPE 312E, or DOW ™ LDPE 310E |

TABLE 5-continued

Example Three Layer Formulations

| Layer | Weight Percentage | Layer Breakdown and Example Composition | |
|---|---|---|---|
| Central Layer | 50-60% | 85-100% | ELITE ™ 5960G or ELITE ™ 5940G |
| | | 0-15% | DOW ™ LDPE 432E, or DOW ™ LDPE 312E, or DOW ™ LDPE 310E |
| Surface Layer | 20-25% | 85-100% | ELITE ™ 5960G or ELITE ™ 5940G |
| | | 0-15% | DOW ™ LDPE 432E, or DOW ™ LDPE 312E, or DOW ™ LDPE 310E |

A first aspect of the disclosure may be directed to a process for making a package comprising a spout comprising: (a) heating a sealing area of a spout to a temperature at or above a melting point of the spout material; (b) heating two multilayer structures around a portion of their peripheries to adhere the peripheries of sealant layers to each other and form a partially sealed package having an opening; (c) inserting at least a portion of the heated spout into the opening; and (d) pressing opposing surfaces of the two multilayer structures around the spout to close the opening around the spout. Each multilayer structure comprises a multilayer film, the multilayer film comprising: the sealant layer having at least 40% by weight of an ethylene-based polymer having a melting point below 112° C., a melt index ($I_2$) from 0.5 to 8 g/10 mins as determined by ASTM D1238 (190° C., 2.16 kg), and a density between 0.880 and 0.918 g/cm$^3$; an external layer comprising ethylene-based polymer; at least one intermediate layer disposed between the sealant layer and the external layer and having a melting point at least 15° C. higher than the sealant layer, wherein the intermediate layer comprises: ethylene-based polymer having a density above 0.920 g/cm$^3$, and a melt index ($I_2$) from 0.25 to 5 g/10 mins; propylene based polymer; or mixtures thereof.

A second aspect of the present disclosure may include the first aspect in which the ethylene-based polymer of the sealant layer is a plastomer having a density from 0.890 to 0.908 g/cm$^3$ and a melt index ($I_2$) from 0.5 to 3 g/10 mins.

A third aspect of the present disclosure may include the first aspect or the second aspect the sealant layer further comprises a low density polyethylene (LDPE) polymer having a density from 0.910 to 0.930 g/cm$^3$ and a melt index ($I_2$) from 0.5 to 7.5 g/10 mins, and optionally one or more of anti-block agent and slip agent.

A fourth aspect of the present disclosure may include the first through third aspects in which the sealant layer comprises at least 80% by weight of the ethylene-based polymer.

A fifth aspect of the present disclosure may include the first through fourth aspects in which the external layer, at least one intermediate layer, or both comprises ethylene-based polymer having a density from 0.940 to 0.970 g/cm$^3$ and a melt index ($I_2$) from 0.5 to 5.0 g/10 mins.

A sixth aspect of the present disclosure may include the first through fifth aspects in which the multilayer film comprises 90 weight percent or more ethylene-based polymer based on the total weight of the multilayer film.

A seventh aspect of the present disclosure may include the first through sixth aspects in which the intermediate layer comprises the ethylene-based polymer, the ethylene based polymer being a linear low density polyethylene (LLDPE) having a density of at least 0.935 g/cm$^3$.

An eighth aspect of the present disclosure may include the first through sixth aspects in which the multilayer film comprises at least 5 layers including a core layer, wherein the core layer comprises ethylene vinyl alcohol, polyamide, or combinations thereof.

A ninth aspect of the present disclosure may include the eighth aspect in which the ethylene based polymer of the intermediate layer is maleic anhydride grafted polyethylene.

A tenth aspect of the present disclosure may include the first through sixth aspects in which each multilayer structure further comprises a second film laminated to the multilayer film.

An eleventh aspect of the present disclosure may include the tenth aspect in which the second film comprises one or more layers comprising ethylene-based polymer having a density from 0.940 to 0.970 g/cm$^3$ and a melt index ($I_2$) from 0.5 to 5.0 g/10 mins.

A twelfth aspect of the present disclosure may include the tenth aspect or the eleventh aspect in which the second film comprises 90 weight percent or more ethylene-based polymer based on the total weight of the second film.

A thirteenth aspect of the present disclosure may include the tenth aspect in which the second film comprises biaxially oriented polypropylene, biaxially oriented polyamide, biaxially oriented or polyethylene terephthalate.

A fourteenth aspect of the present disclosure may include the first through thirteenth aspects in which the spout comprises high density polyethylene.

A fifteenth aspect of the present disclosure may include the first through fourteenth aspects in which the process further comprises heating the opposing structure surfaces to close the opening around the spout.

A sixteenth aspect of the present disclosure may include the first through fifteenth aspects in which the opposing structure surfaces are simultaneously heated and pressed to close the opening around the spout.

A seventeenth aspect includes a package comprising a spout made by the process of any of the first through sixteenth aspects.

An eighteenth aspect of the present disclosure may include the seventeenth aspect in which the package is a pouch.

Throughout this disclosure ranges are provided for various properties of the adhesive composition, multilayer film, and packaging that include the adhesive composition or the multilayer film. It will be appreciated that when one or more explicit ranges are provided the individual values and the ranges formed therebetween are also intended to be provided, as providing an explicit listing of all possible combinations is prohibitive. For example, a provided range of 1-10 also includes the individual values, such as 1, 2, 3, 4.2, and 6.8, as well as all the ranges which may be formed within the provided bounds, such as 1-8, 2-4, 6-9, and 1.3-5.6.

It should now be understood that various aspects of the process for making a package comprising a sprout and multilayer films forming said package are described and such aspects may be utilized in conjunction with various other aspects. It should also be understood to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

The invention claimed is:

1. A process for making a package comprising a spout, the process comprising:
 (a) heating a sealing area of a spout to a temperature at or above a melting point of the spout material;
 (b) heating two multilayer structures around a portion of their peripheries to adhere the peripheries of sealant layers to each other and form a partially sealed package having an opening, wherein each multilayer structure comprises a multilayer film, the multilayer film comprising:
  the sealant layer having at least 40% by weight of a first ethylene-based polymer having a melting point below 112° C., a melt index ($I_2$) from 0.5 to 8 g/10 mins as determined by ASTM D1238 (190° C., 2.16 kg), and a density between 0.880 and 0.918 g/cm$^3$;
  an external layer comprising a second ethylene-based polymer;
  at least one intermediate layer disposed between the sealant layer and the external layer and having a melting point at least 15° C. higher than the sealant layer, wherein the intermediate layer comprises: a third ethylene-based polymer having a density above 0.920 g/cm$^3$, and a melt index ($I_2$) from 0.25 to 5 g/10 mins; a propylene based polymer; or mixtures of the third ethylene-based polymer and the propylene based polymer; and
 (c) inserting at least a portion of the heated spout into the opening; and
 (d) pressing opposing surfaces of the two multilayer structures around the spout to close the opening around the spout.

2. The process of claim 1, wherein the external layer, at least one intermediate layer, or both comprises ethylene-based polymer having a density from 0.940 to 0.970 g/cm$^3$ and a melt index ($I_2$) from 0.5 to 5.0 g/10 mins.

3. The process of claim 1, wherein the multilayer film comprises 90 weight percent or more ethylene-based polymer based on the total weight of the multilayer film.

4. The process of claim 1, wherein third ethylene based polymer of the intermediate layer comprises a linear low density polyethylene (LLDPE) having a density of at least 0.935 g/cm$^3$.

5. The process of claim 1, wherein the spout comprises high density polyethylene.

6. The process of claim 1, wherein the opposing structure surfaces are simultaneously heated and pressed to close the opening around the spout.

7. The process of claim 1, wherein the first ethylene-based polymer of the sealant layer is a plastomer having a density from 0.890 to 0.908 g/cm$^3$ and a melt index ($I_2$) from 0.5 to 3 g/10 mins.

8. The process of claim 7, wherein the sealant layer further comprises a first low density polyethylene (LDPE) polymer having a density from 0.910 to 0.930 g/cm$^3$ and a melt index ($I_2$) from 0.5 to 7.5 g/10 mins.

9. The process of claim 1, wherein the sealant layer further comprises a first low density polyethylene (LDPE) polymer having a density from 0.910 to 0.930 g/cm$^3$ and a melt index ($I_2$) from 0.5 to 7.5 g/10 mins.

10. The process of claim 9, wherein the sealant later further comprises one or more of an anti-block agent and a slip agent.

11. The process of claim 1, wherein the multilayer film comprises at least 5 layers including a core layer, wherein the core layer comprises ethylene vinyl alcohol, polyamide, or combinations thereof.

12. The process of claim 11, wherein the third ethylene based polymer of the intermediate layer is maleic anhydride grafted polyethylene.

13. The process of claim 1, wherein each multilayer structure further comprises a second film laminated to the multilayer film.

14. The process of claim 13, wherein the second film comprises one or more layers comprising a fourth ethylene-based polymer having a density from 0.940 to 0.970 g/cm$^3$ and a melt index ($I_2$) from 0.5 to 5.0 g/10 mins.

15. The process of claim 13, wherein the second film comprises 90 weight percent or more ethylene-based polymer based on the total weight of the second film.

16. The process of claim 13, wherein the second film comprises biaxially oriented polypropylene, biaxially oriented polyamide, or biaxially oriented polyethylene terephthalate.

17. The process of claim 1, wherein the sealant layer further comprises a first low density polyethylene (LDPE) polymer having a density from 0.910 to 0.930 g/cm$^3$ and a melt index ($I_2$) from 0.5 to 7.5 g/10 min;
 the external layer, at least one intermediate layer, or both comprises ethylene-based polymer having a density from 0.940 to 0.970 g/cm$^3$ and a melt index ($I_2$) from 0.5 to 5.0 g/10 mins; and
 the third ethylene based polymer of the intermediate layer comprises a linear low density polyethylene (LLDPE) having a density of at least 0.935 g/cm$^3$.

18. The process of claim 17, wherein the multilayer film comprises at least 5 layers including a core layer, wherein the core layer comprises ethylene vinyl alcohol, polyimide, or combinations thereof.

19. The process of claim 18, wherein each multilayer structure further comprises a second film laminated to the multilayer film.

* * * * *